United States Patent [19]

Gray

[11] 4,346,425
[45] Aug. 24, 1982

[54] MASS MAGNETIC TAPE DEGAUSSING SYSTEM

[76] Inventor: Billy C. Gray, 765 Baca Rd., Las Cruces, N. Mex. 88001

[21] Appl. No.: 207,517

[22] Filed: Nov. 17, 1980

[51] Int. Cl.³ ............................................. H01F 13/00
[52] U.S. Cl. ................................................... 361/151
[58] Field of Search .......................... 361/151; 360/66

[56] References Cited

U.S. PATENT DOCUMENTS 3,506,884  4/1970  McKinley ........................ 317/157.5
3,938,011  2/1976  Littwin ..................... 317/157.5 MR Primary Examiner—J. D. Miller
Assistant Examiner—L. C. Schroeder
Attorney, Agent, or Firm—Nathan Edelberg; Robert P. Gibson; Saul Elbaum

[57] ABSTRACT

A mass degaussing apparatus is disclosed which comprises a movable dolly capable of holding a plurality of magnetic tapes. Automatic means are provided for moving the dolly into and out of a degaussing chamber wherein means are provided to generate an electromagnetic field. The apparatus is capable of degaussing a large plurality of magnetic tapes in a single operation.

9 Claims, 5 Drawing Figures

MASS MAGNETIC TAPE DEGAUSSING SYSTEM

RIGHTS OF THE GOVERNMENT

The invention described herein may be manufactured, used and licensed by or for the United States Government for governmental purposes without the payment to me of any royalty thereon.

BACKGROUND OF THE INVENTION

Magnetic tape is a medium which is widely used for data storage as well as for sound recording. When previously used tapes are to be reused, it is generally desirable to degauss or erase old signals from the tape. This will result in a clean tape, free from noise and interference which would result from residual magnetic signals. In many situations in which security is a factor, it is essential to eradicate the information stored on a tape in order to prevent discovery of the information by unauthorized individuals.

Magnetic tapes may often be degaussed linearly on the recording apparatus with which the tape is associated. Additionally, there are many devices in existence, commonly known as "bulk tape erasers", which are designed to degauss an entire reel of tape in bulk. These devices generally comprise means to position the reel of tape within the zone of flux of a magnetic field. The powerful magnetic field erases any residual signals on the tape. While these bulk erasers are generally satisfactory, the devices of the prior art usually require each reel of tape to be individually positioned on or within the degaussing device.

U.S. Pat. No. 3,506,884 and U.S. Pat. No. 3,938,011 each disclose apparatus which represents an improvement over many of the other degaussing units known in the art. In order to facilitate the handling of respective reels of tape, the apparatus disclosed in each of these patents comprises conveyor means which feeds the successive reels of tape through degaussing units situated in proximity to the conveyor. While the devices shown in these patents facilitate the handling of a great number of individual reels, it is still necessary for an operator to place each reel individually on the conveyor and individually retrieve each reel therefrom. Thus, as in the other bulk erasing devices known in the art, it is necessary for an operator to continually attend the degaussing apparatus.

It is an object of this invention to provide an apparatus which is capable of overcoming the drawbacks associated with the prior art degaussing devices.

It is an object of this invention to provide means capable of rapidly and efficiently degaussing a large number of magnetic tapes.

It is another object of this invention to provide degaussing apparatus which is capable of efficiently degaussing a large number of magnetic tapes without requiring the continual attention of an operator.

It is another object of this invention to provide apparatus capable of simultaneously degaussing both sides of a reel of magnetic tape in order to fully erase residual signals.

It is still another object of this invention to provide efficient and effective degaussing means which utilizes electrical power more efficiently than the prior art devices.

SUMMARY OF THE INVENTION

The apparatus of the present invention comprises means to position a plurality of magnetic tapes in a series of rows. Automatic means are provided for moving the rows of tapes into and out of a degaussing chamber. Electromagnetic arms are positioned within the chamber such that the rows of tapes pass between respective electromagnetic arms thereby degaussing the tapes. Means are also provided for dissipating the heat generated within the degaussing chamber.

DESCRIPTION OF A PREFERRED EMBODIMEMT

Figure 1:
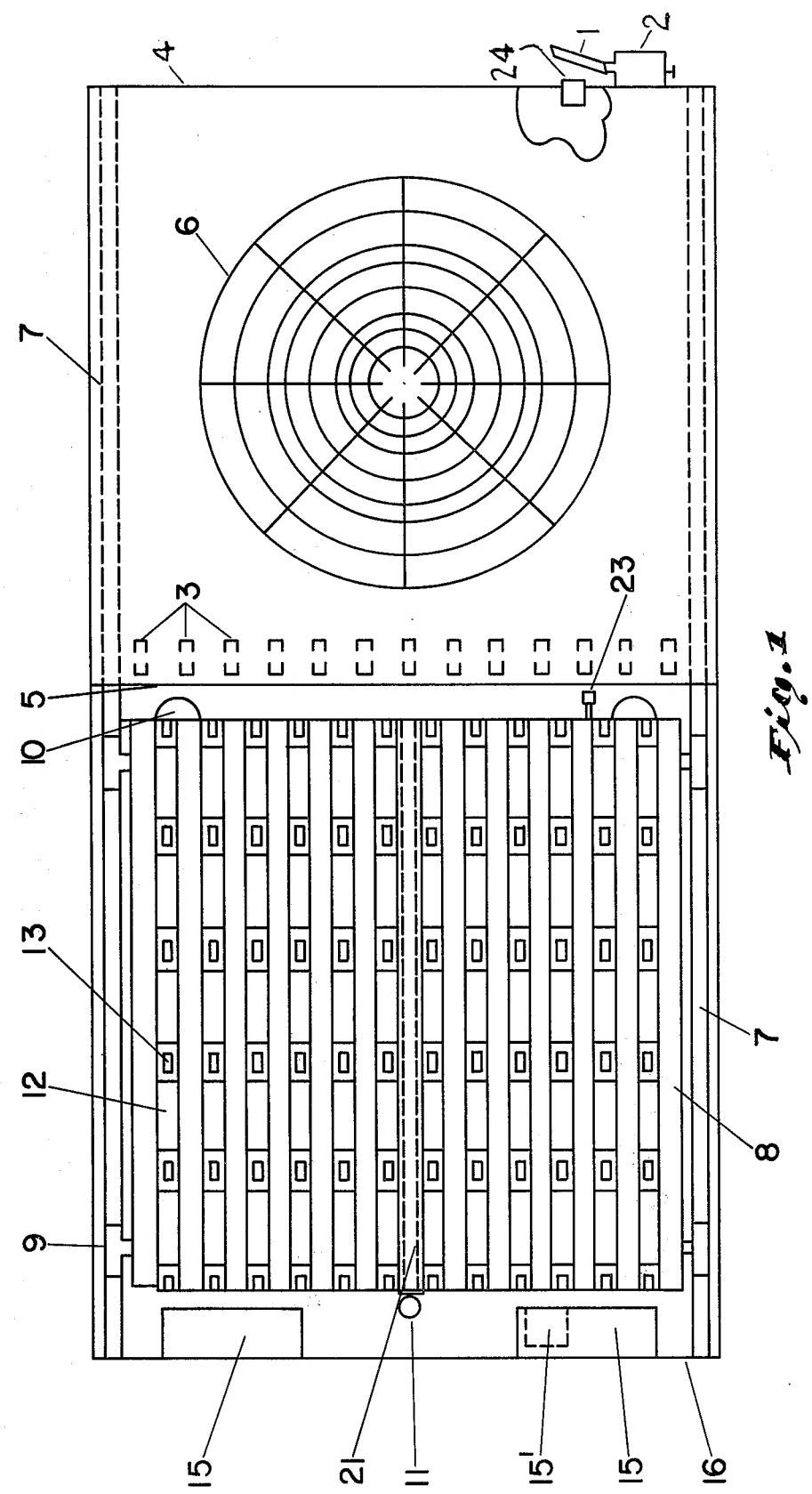
FIGS. 1, 2 and 3 are top, side and end views of the apparatus of the present invention, respectively.
Figure 2:
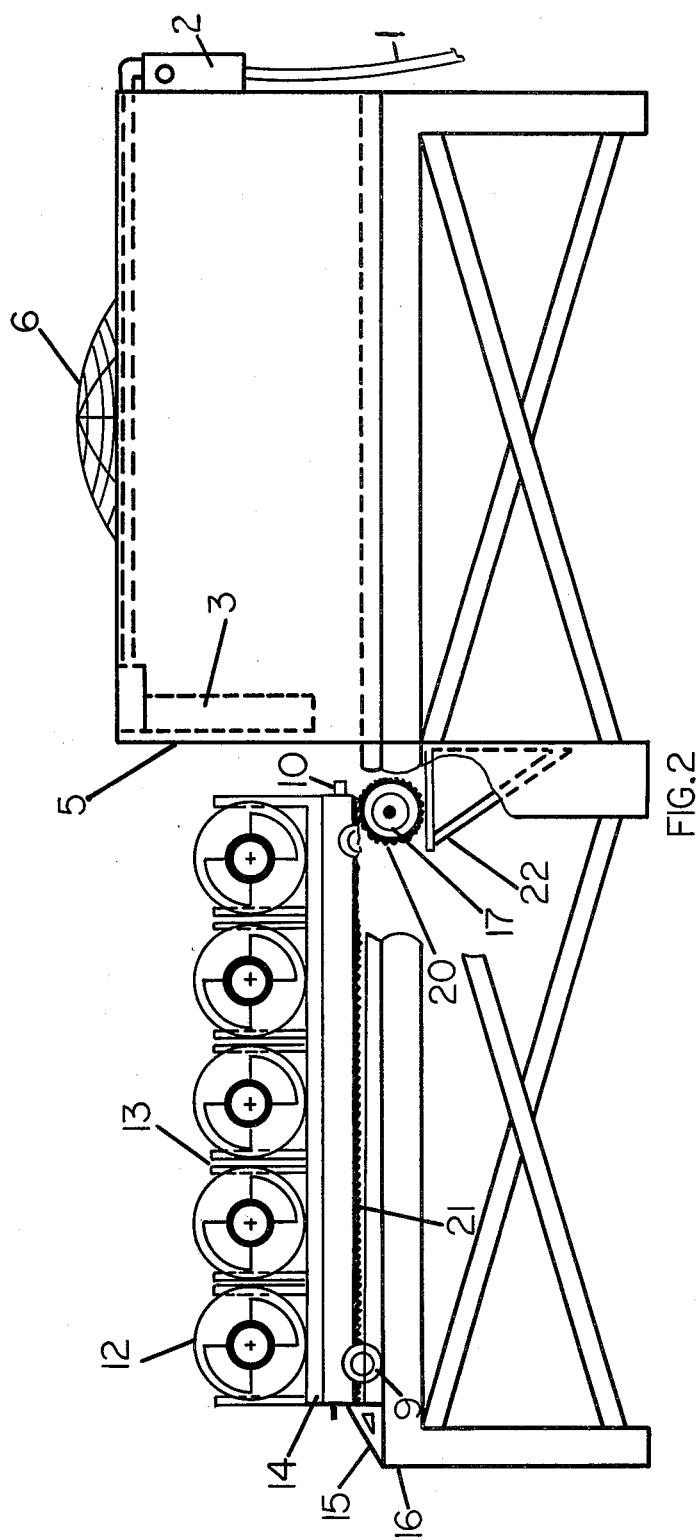
Figure 3:
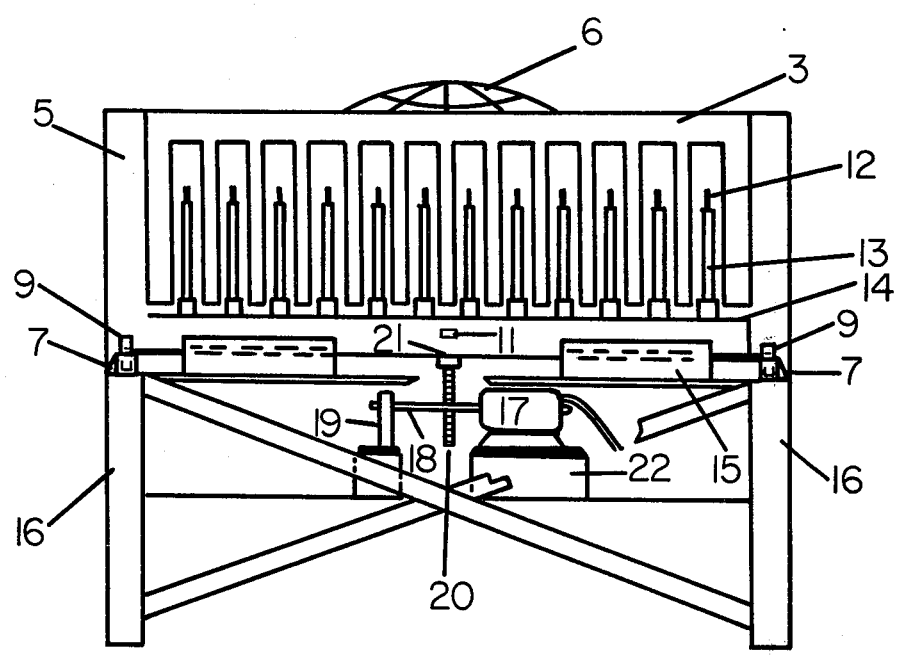

Referring to FIGS. 1-3, reference numeral 16 depicts a frame of any suitable configuration. Supported on the frame is a housing 4 having an open portion 5. This comprises the degaussing housing or chamber. Reference numeral 6 indicates a fan or other ventilating means to dissipate heat generated within the housing. Power source 1 feeds electrical power through switch 2 to a series of electromagnetic arms 3. These arms generate the electromagnetic field which degausses the tapes.

When the apparatus is inactive, tape dolly 8 rests upon frame 16 in a position adjacent the open face 5 of the housing 4. The dolly comprises upright rack bars 13 welded or otherwise affixed to risers 14 spanning the full length of the tape dolly. The risers and upright bars are arranged in such manner as to retain the tapes in a series of rows on the tape dolly, as will be described in greater detail below. The dolly may traverse the entire length of frame 16 along tracks 7 affixed thereto by means of wheels 9 which rest upon the tracks.

Shelf 22 supports reversible drive motor means 17 at a position beneath the tape dolly. Motor 17 and bearing 19, as seen in FIG. 3, support shaft 18 having pinion gear 20 affixed thereto. Pinion gear 20 engages rack 21 attached to the bottom of the tape dolly.

When it is desired to degauss a group of magnetic tapes, the tapes are loaded onto the tape dolly in a series of rows as determined by the configuration of the dolly. In FIG. 1, it can be seen that the exemplary embodiment comprises 5 rows of 12 tapes each. The particular capacity of the apparatus may obviously be varied by adjusting the width or length of the tape dolly. Once the tapes are loaded, power may be provided to the electromagnetic arms 3 via switch 2. At the outset, tape dolly 8 is positioned adjacent to stops 15 which prevent the dolly from travelling past the end of the frame members. Switching means 15' is provided to initiate operation of the apparatus.

Upon activation of switch means 15', drive motor 17 will turn pinion gear 20 in a clockwise direction as seen in FIG. 2, thereby driving the tape dolly into the degaussing chamber 4. As the dolly enters the chamber, the respective groups or rows of tapes pass between the several electromagnetic arms 3, as can be seen in FIG. 3 of the drawings. In passing through the electromagnetic field residual signals on the tapes are erased.

Tape dolly 8 travels into the degaussing chamber until contact means 23 on the dolly engages reversing switch 24. This reverses the direction of the drive motor 17, causing the tape dolly to be driven out of the degaussing chamber. Bumper stop means 10 are provided on the dolly to limit the extent of travel into the chamber and to prevent damage of the switch means 24 and contact 23. As the dolly passes out of the chamber, the tapes again pass through the electromagnetic field generated by the arms 3. Upon again contacting switch means 15', the drive motor 17 is shut down, terminating operation of the apparatus. It may also be desirable to interconnect the power supply switch 2 to the automatic cut-off switch 15'.

Eyelet 11 may be provided on the tape dolly 8, allowing for manual engagement of the dolly in the event of a failure of the motor 17.

Figure 4A:
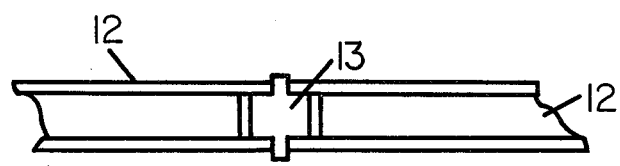
FIGS. 4A and 4B are top and side views, respectively, of the tape positioning means of the present invention.
Figure 4B:
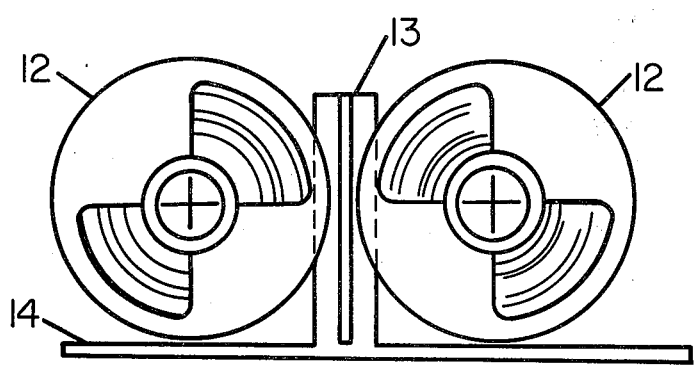

FIGS. 4A and 4B illustrate in greater detail the configuration of the upright rack bars 13 which retain tapes 12 on the tape dolly. The bars 13 are generally cross shaped, thereby intermeshing with the flanges of the tape reels 12. This configuration allows the tapes to be held securely in an upright position without interfering with the electromagnetic field passing through the tape wound on the respective reels. It is evident that the upright bars 13 could be redesigned in order to accommodate tape cassettes or tape cartridges of other configurations.

The apparatus of the present embodiment allows each and every magnetic tape to be degaussed from both sides simultaneously. The degaussing of the respective tapes will thus be highly effective, thereby fulfilling strictest security requirements. Additionally, the present apparatus is capable of degaussing simultaneously a great number of magnetic tapes, thus reducing the overall average degaussing time for each tape. This can be accomplished with the additional reduction of labor required for the degaussing operation. Prior art degaussing devices, as mentioned above, require continual attendance by an operator to feed the tapes into the apparatus and retrieve the tapes individually therefrom. The present apparatus does not require constant attention. Once the tapes are loaded onto the tape dolly and switching means 15' is activated, the entire group of magnetic tapes is effectively degaussed quickly without requiring the operator to further attend to the process. The result is a great savings in the cost of labor.

The apparatus of the present invention uses relatively less electrical power for the degaussing operation than the prior art devices disclosed in U.S. Pat. Nos. 3,506,884 and 3,938,011. The devices of those patents comprise conveyor means to facilitate the feeding of tapes through the degaussing apparatus. Power must be continually supplied to the electromagnetic field of the apparatus while the tapes are fed intermittently along the conveying means. The result is that an electromagnetic field is continually generated while tapes are only intermittently passed therethrough. The present invention comprises means to arrange the respective tapes in a relatively dense pattern, and provides power to the electromagnetic field only while the tapes are positioned within that field. Any electrical power provided to the electromagnetic arms of the present invention is efficiently utilized in degaussing the tapes being erased. Thus, for a given number of tapes being degaussed, the total power utilized by the apparatus of the present invention is significantly less than the power required by the prior art devices.

While the present invention has been described with reference to the accompanying drawings, I did not wish to be limited to the details shown therein as obvious modifications may be made by one of ordinary skill in the art.

I claim:

1. A mass degaussing apparatus, comprising,
means for simultaneously positioning a plurality of magnetic tapes in an upright position in an array, and
means for degaussing the plurality of magnetic tapes in said array.

2. Apparatus as in claim 1, wherein said means for positioning a plurality of tapes comprises means for arranging said tapes in multiple rows.

3. A mass degaussing apparatus comprising:
means for simultaneously positioning a plurality of magnetic tapes in an array and for arranging said tapes in multiple rows; and
electromagnetic means positioned between said respective rows of tapes for degaussing the plurality of magnetic tapes in said array.

4. Apparatus as in claim 3, wherein said means for positioning said tapes and said means for degaussing are movable relative to one another.

5. Apparatus as in claim 3 or 4, wherein said means for degaussing comprises multiple electromagnetic arms extending between said multiple rows of magnetic tapes.

6. Apparatus as in claim 4, further comprising means for moving said array of tapes relative to said means for degaussing said tapes.

7. Apparatus as in claim 6, wherein said means for moving said array of tapes comprises means for moving said array in either of opposite directions with respect to said means for degaussing said tapes.

8. Apparatus as in claim 6, wherein said means for positioning said tapes in an array comprises a rack means for holding said tapes in rows, and said means for moving said array comprises motive means for moving said rack relative to said means for degaussing the tapes.

9. Apparatus as in claim 8, wherein said motive means comprises a reversible drive motor.

* * * * *